June 24, 1930. W. B. DAVIS 1,765,659
SPEED REGULATOR FOR MOTOR VEHICLES
Filed June 18, 1923   2 Sheets-Sheet 1
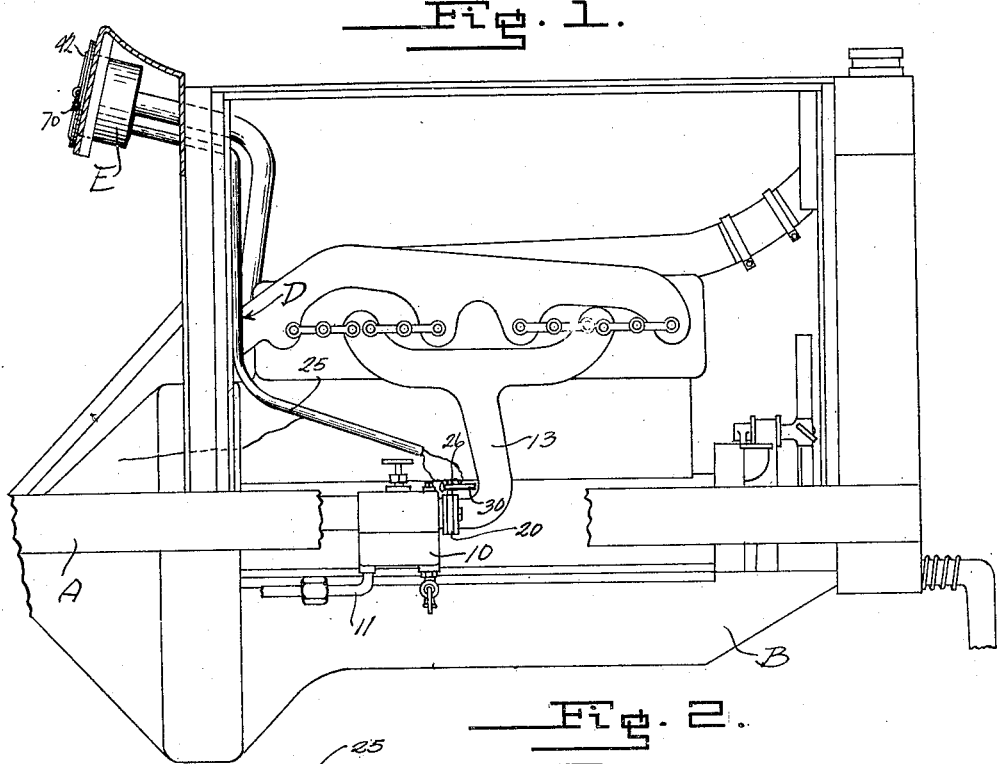
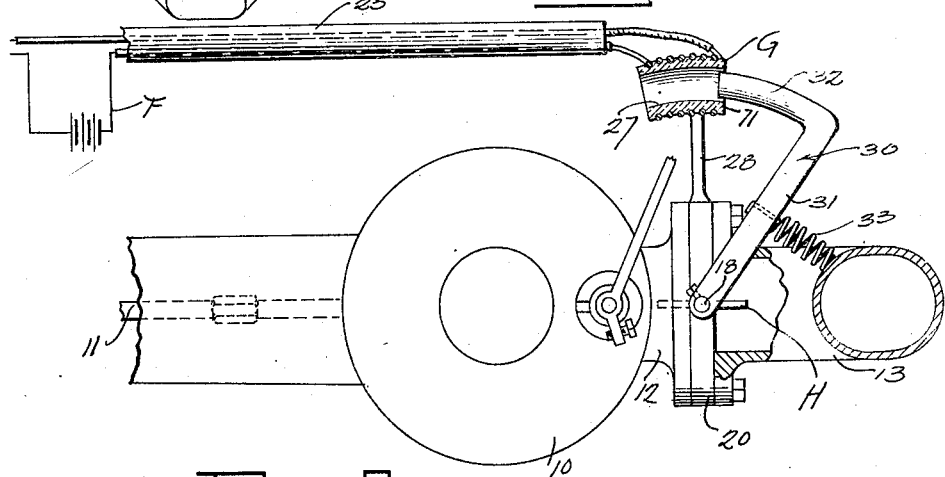
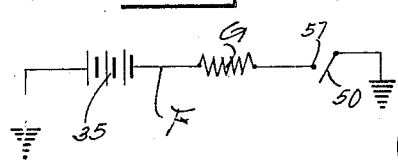
Walter B. Davis June 24, 1930. W. B. DAVIS 1,765,659
SPEED REGULATOR FOR MOTOR VEHICLES
Filed June 18, 1923  2 Sheets-Sheet 2
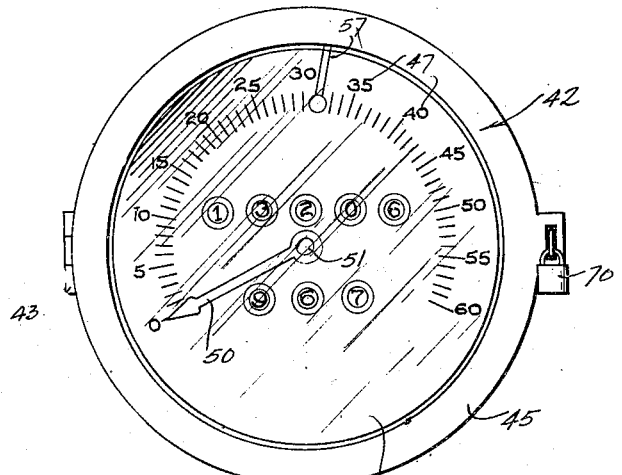
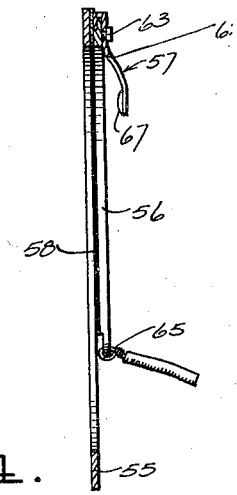
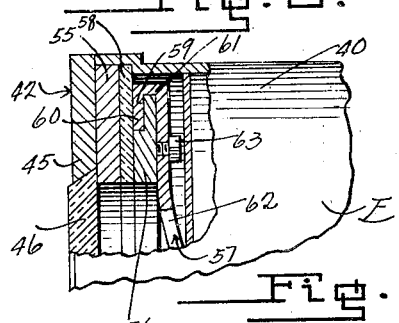
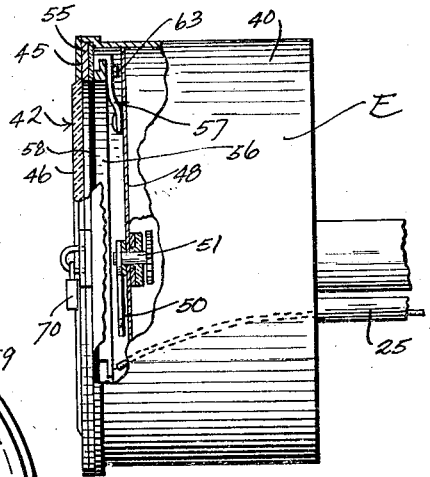
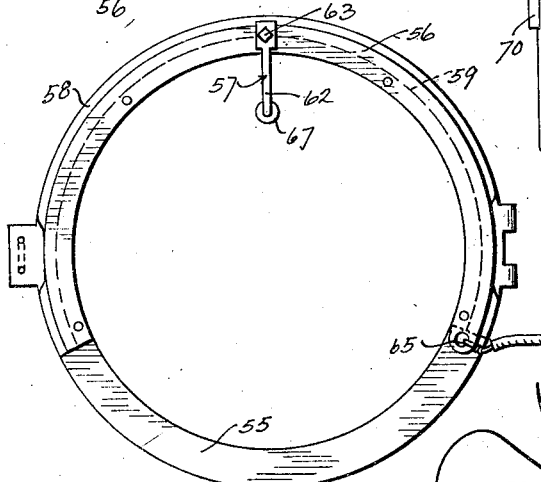
Inventor
Walter B. Davis
By Lancaster and Allwein
Attorneys Patented June 24, 1930

1,765,659

UNITED STATES PATENT OFFICE

WALTER B. DAVIS, OF AURORA, ILLINOIS

SPEED REGULATOR FOR MOTOR VEHICLES

Application filed June 18, 1923. Serial No. 646,241.

This invention relates to improvements in means for automatically regulating the speed of motor vehicles.

The primary object of this invention is the provision of speed regulating apparatus for motor vehicles which contemplates the regulation of fuel, so that but a limited quantity of the same may be fed to the internal combustion after the vehicle has attained a predetermined speed, thus preventing exceeding of such speed, and tending to lower the vehicle speed.

A further object of this invention is the provision of speed regulating apparatus of the above mentioned character which is electrically operated, and the circuit of which embodies a speedometer regulated switch mechanism adapted to close when the speedometer indicates a predetermined speed.

Other objects and advantages of this invention will be apparent during the course of the following detailed description.

In the accompanying drawings, forming a part of this specification, and wherein similar reference characters designate corresponding parts throughout the several views:

Figure 1 is a fragmentary side elevation, partly in section, of a vehicle, showing the internal combustion engine used for propelling thereof, and details of the improved speed regulating apparatus as used in connection therewith.

Figure 2 is a fragmentary plan view, partly in cross section, and partly diagrammatic, showing details of the improved speed regulating apparatus, by means of which the supply of motor fuel may be restricted.

Figure 3 is a front elevation of a speedometer constructed to accord with this invention.

Figure 4 is a side elevation, partly in cross-section, showing cooperating details of this invention as embodied in a speedometer.

Figure 5 is a fragmentary enlarged view, partly in cross section, showing a portion of the speedometer constructed after this invention.

Figure 6 is a detail of this invention which is used within the speedometer of the vehicle with which the speed control apparatus is used.

Figure 7 is a rear elevation of a detail of this invention which may be used within a carburetor.

Figure 8 is a diagrammatic representation of the wiring system of this invention.

In the drawings, wherein for the purpose of illustration is shown but the preferred embodiment of this invention, the letter A may generally designate a motor vehicle of any approved type, which may use an internal combustion engine B as propelling means therefor. In connection with the speed regulation of the vehicle A, the means D may be used for regulating the supply of fuel to the internal combustion engine B; the means D preferably including a speedometer E, embodying certain novel structure, the circuit F which includes a solenoid G, and a valve H which is automatically controlled by energizing the solenoid G, as will be subsequently described.

In connection with the internal combustion engine B, a carburetor 10 may be employed, which may have a fuel supply pipe 11 leading thereinto, and from which a pipe portion 12 may lead, adapted for connection to the outer end of the intake pipe 13, as will be subsequently described.

The specific object of this invention resides in the regulation of fuel in so far as intake into the cylinders of the engine B is concerned, in contra-distinction to speed regulators for motor vehicles which contemplates cutting off the ignition of the engine, when the vehicle speed exceeds a certain amount. The defect of vehicle speed regulation by shutting off of ignition is well understood, as the ignition is cut off usually when the throttle is wide open, thus permitting the cylinders of the engine to receive exceptionally rich charges, which are not exploded, but are pumped into the exhaust manifold and muffler. When the speed drops as to again complete the ignition circuit, such collection of fuel charge within the exhaust and muffler chambers is very often exploded, resulting in destruction to the engine or muffler. However, with this invention, such occurrences are rendered impossible, and the fuel is conserved in consequence thereof.

The valve H may be of any approved construction, and is preferably oscillatively mounted, as by a pin 18 upon a supporting ring 20, which may be clamped adjacent the carburetor 10, intermediate the intake 13 and the carburetor pipe connection 12. The valve H is not to be limited to this location, as it may be located in the supply pipe 11, if desired, the primary purpose of this valve being the regulation of fuel charge to the engine B.

Referring to the circuit F, the same includes a wiring system which extends from the speedometer E through a protecting conduit 25, and includes at its forward end the solenoid G, of any approved construction, although preferably providing an arcuate passageway 27 therein, which may be arranged concentric with the valve pin 18. The solenoid G may be supported, as by an arm or bracket 28 attached to the ring 20, so that the valve is always in a predetermined relation with respect to the solenoid G. The valve H preferably includes a substantially L-shaped operating arm 30, which includes a straight lever arm 31 connected at its free end in any approved manner to the valve pin 18, and at its other end having the arcuate lever arm 32 slidably extending into the passageway 27 of the solenoid G and adapted to be attracted by said solenoid upon its magnetization, as will be subsequently described. A spring 33 is preferably provided, attached at one end to the intake pipe 13 and at its other end preferably engaging the lever arm 31 to normally position the valve H open, substantially as is illustrated in Figure 2 of the drawings. The circuit system F preferably includes a storage battery 35, which may be the ordinary ignition battery or a special battery provided for solely operating the circuit through the solenoid G.

Referring to the construction of the speedometer E, the same may preferably include operating details of ordinary construction, and operated either from the vehicle wheel or the transmission mechanism. It includes a housing 40, having a front closure 42, hingedly connected as at 43, laterally at the front of the housing 40; said closure 42 preferably including the ring shaped supporting portion 45, which may support the transparent plate 46, so as to render the delineation 47 upon the dial 48 visible exterior of the speedometer E. The speedometer furthermore includes an indicator arm 50, which is pivoted as at 51, within the housing 40, and cooperates over the delineation 47, to designate vehicle speed, as is well understood. The indicator arm 50 preferably comprises one contact of a switch mechanism provided within the speedometer E, and to this end is preferably connected in the wiring system of the circuit F.

A ring shaped support 55 is preferably mounted within the housing 40 forwardly of the dial 48, which may support rearwardly thereof a crescent shaped support 56 for an adjustable contact 57; said support 56 being insulated, as by an insulation strip 58, from the support 55 to which it is connected. The crescent shaped contact support 56 preferably provides a groove 59 thereabout, into which a finger 60 of the contact 57 extends; said contact 57 preferably extending from the groove 59, as at 61, and downwardly, as at 62, to project over the front of the dial 48, and in cooperation over the delineations 47. The contact 57 is adjustable about the support 56, and may include a set screw 63, so that the same may be clamped in any approved position upon the support 56, and over a predetermined delineation 47. The crescent support 56 is preferably connected in the circuit F as at 65, and the contact arm 50 as the same moves about the speedometer, may engage the inner end or tip 67 of the contact 57, for closing the circuit F for operating the solenoid G.

Referring to the operation of this invention, the adjustable contact 57 is first adjusted upon its supporting portion 56, so that the inner end 67 thereof lies over a predetermined delineation 47, indicating the maximum speed at which it is desired to run the vehicle upon which the speedometer E is mounted. The closure member 42 is of course open during this adjusting operation, and when it has been completed the closure member 42 is closed, and locked, as by means 70, so that no unauthorized tampering with the speedometer E is possible. Normally, the spring 33 retains the valve H wide open, so that fuel charges may enter the internal combustion engine cylinders in accordance with the desire of the vehicle driver. As the vehicle's speed is increased, the indicator arm 50, of course, moves over the dial 48, and as the free end of the arm 50 engages the adjustable contact 57, the circuit F is closed, energizing the solenoid G, which in accordance with well known principles attracts the arcuate lever arm 32 of the operating lever 30, swinging the valve H toward closed position within the passageway of the fuel conduit, tending to cut off supply of fuel to the engine cylinders. This will, of course, automatically decrease the speed of the vehicle. The valve H is never entirely closed, so that it is not possible by the means D to completely shut off supply of fuel to the internal combustion engine as to stop the same. The lever 30, when the valve H is in its most closed position abuts the edge 71 of the solenoid G, thus preventing any further closing of the valve H.

From the foregoing description of this invention, it is apparent that a practical speed control device for vehicles has been provided, which may include the ordinary speedometer as an automatic operator therefor notwithstanding the ordinary delicacy of such instrument. It will be apparent that such a speed regulating device is of the highest utility, not alone in its tendency to reduce accidents, but also because of its usefulness in conserving fuel, besides other collateral advantages.

Various other changes in the shape, size, and arrangement of parts, may be made to the form of invention herein shown and described, without departing from the spirit of the invention or the scope of the claim.

I claim:

In a speed regulator attachment for motor vehicles the combination of a relatively thin supporting ring having a passageway therethrough, a valve operating in said passageway having a pin rotatably bearing in said ring, a lever arm connected with said pin in right angled relation therewith exteriorly of the ring, said arm at the free end thereof having a rigidly connected arcuate armature struck concentric with the pivot axis of said pin, a bracket arm radially carried by said ring rigid therewith, and a solenoid tube carried by said bracket arm at the outer end thereof having an arcuate passageway therein struck concentric with the valve pin axis, the passageway of the solenoid tube being adapted to receive the arcuate armature of the valve arm therein, the valve arm bearing such a relation to the tube that it will contact the solenoid tube prior to the closing of the valve in the passageway of the ring to hold said passageway partially open.

WALTER B. DAVIS.